Aug. 30, 1932.  G. L. ROTHROCK  1,874,354
MECHANISM TO PREVENT BRAKE CHATTER
Filed June 28, 1930

Inventor
George L. Rothrock
By Blackmore, Spencer & Heib
Attorneys

Patented Aug. 30, 1932

1,874,354

UNITED STATES PATENT OFFICE

GEORGE L. ROTHROCK, OF DETROIT, MICHIGAN, ASSIGNOR TO GENERAL MOTORS CORPORATION, OF DETROIT, MICHIGAN, A CORPORATION OF DELAWARE

MECHANISM TO PREVENT BRAKE CHATTER

Application filed June 28, 1930. Serial No. 464,565.

This invention relates to brakes and particularly to brakes for use with vehicle wheels.

The object of the invention is to prevent chattering when the brakes are applied. Other incidental objects will appear from the following description.

The invention herein described is illustrated in the accompanying drawing in which—

Figure 1:
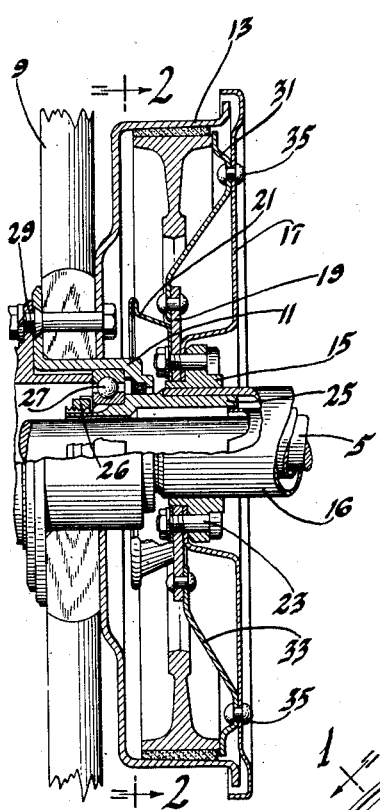
Fig. 1 is a view of a vehicle wheel hub and brake drum substantially on line 1—1 of Fig. 2.

Referring by numerals to the drawing, there is shown at 5 a live axle used for driving the wheel. The wheel illustrated is a spoked wheel and is represented by numeral 9. The wheel is provided with a wheel hub 11. The wheel carries also a brake drum 13. To a flange 15 on the axle housing 16 is secured a dust shield 17, and also a plate 19 which serves as a brake shoe anchorage. There is also shown an oil guard 21 secured to the flange 15 by the same fastening means 23 which is used for securing the parts 17 and 19. The housing 16 has an extension 25 and a ball bearing 27 is located between the extension 25 and the wheel hub 11. The wheel hub 11 and the extension 25 have shoulders to engage the outer and inner races of the bearing as clearly shown in Fig. 1. An annular locking ring 26 is threaded on the end of extension 25 to engage the outer side of the inner bearing race. A driving hub 29 used for transmitting the drive from the live axle to the wheel in a well known manner is extended within the wheel hub 11 and engages the outer side of the outer bearing race.

In the construction shown in the drawing the bearing 27 for the rotatable support of the wheel is located somewhat inwardly from the vertical plane of the wheel center and between that plane and the mid plane of the brake shoes. This location has been adopted for the purpose of locating the bearing between the forces due to brake application, and the reactionary force due to the weight of the car, and operable through the vertical plane of the wheel. This is done to reduce the maximum load on the bearing.

Figure 3:
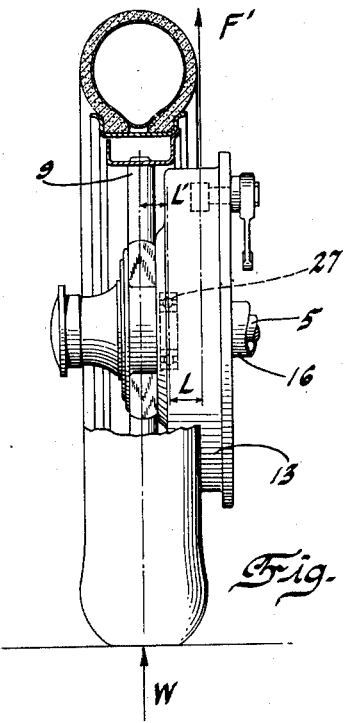
Fig. 3 is a view of a vehicle wheel partly in elevation and partly in section.
Figure 2:
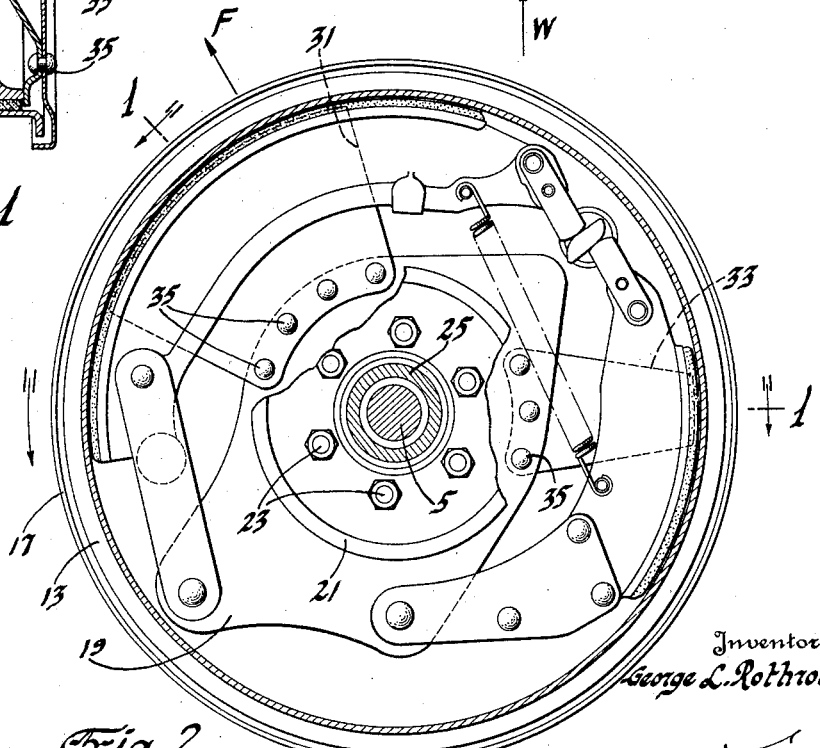
Fig. 2 is a vertical section through the drum on line 2—2 of Fig. 1.

In Fig. 3 an arrow W is used to represent the reaction due to the weight of the car and operating through the plane of the wheel. The letter F represents the force applied against the brake drum as the result of brake application. This force F is illustrated in Fig. 2 as extending upwardly and forwardly, and represents the action in the case of the self-actuating shoe effective for resisting forward movement of the vehicle. There will be a similar upward and rearwardly directed force for the other shoe which is smaller and for present purposes may be disregarded. The force F has a vertical component F' which falls at a distance L (see Fig. 3) from the bearing and inwardly from the bearing. The reaction W passes at a distance L' from the bearing and outwardly from the plane of the bearing. Each of these two forces tends to rotate the wheel about its bearing, the direction of rotation at any one time depending upon the relative magnitude of the forces F' and W.

When the brake is not applied obviously the force W is not resisted by any force F'. As the brake is being applied a condition occurs during light braking application in which the two forces W and F' approximately balance each other. When now the force F' slightly exceeds the force W the wheel is rotated about the bearing, so that the drum is moved away from the shoe, whereupon the force F' is reduced and the wheel is returned to its original position causing a pronounced chatter.

To overcome this chattering noise the brake drum flange is made slightly conical. The drawing shows the flange taper exaggerated to more clearly disclose the invention. As a result the engagement of the shoe and drum which is in a generally vertical direction, is somewhat modified and there is a horizontal component in the reaction between the drum and the shoe. This horizontal component is intended to overcome the brake chattering explained above. The horizontal force is received and resisted by one or more brake shoe guides. These guides are designated on the drawing by numeral 31 in the case of the long self-actuating shoe, and by 33 in the case of the shorter shoe. They may be fixed in position by fastening means 35 which is used to attach them to the dust shield and to the plate 19. At their ends these guides 31 and 33 engage the edges of the shoes as shown in the drawing.

By the arrangement described, the position of the bearing for supporting the wheel on the axle housing has been advantageously located between the planes of the forces F and W. By designing the drum as explained above and by using the horizontal thrust-resisting plates chatter has been avoided.

I claim:

1. In combination, an axle, a wheel, a bearing between the axle and wheel located out of the plane of the wheel, said bearing constituting the only bearing support for said wheel, a brake including a drum carried by said wheel, and shoes engaging the drum on that side of the bearing opposed to the wheel plane, said brake constructed to produce a horizontal component in the reaction between the drum and the shoe.

2. In combination, an axle, a wheel, a bearing between the axle and wheel located out of the plane of said wheel, said bearing constituting the only bearing support for said wheel, a brake including a drum carried by the wheel and shoes engaging the drum on the side of the bearing opposed to the wheel plane, said drum having a tapered flange whereby the engagement of the shoe and drum is accompanied by a horizontal component to prevent brake chatter.

3. The invention defined by claim 2, together with means to resist said horizontal component.

4. The invention defined by claim 2, together with means rigid with said axle and engaging said brake shoe to resist said horizontal component.

5. In combination, a vehicle axle, a wheel, a bearing for said wheel, said bearing affording the only rotary support for said wheel, the vertical plane of said wheel being disposed on one side of said bearing and means associated with said wheel and axle to check wheel rotation, said means positioned on the other side of said bearing, and constructed to provide a horizontal component when the brake is applied to resist chatter when the intensity of the braking means approximates the reaction of the load supported by the wheel.

6. The invention defined by claim 5, together with means engaging a part of said braking mechanism to resist said horizontal component.

In testimony whereof I affix my signature.

GEORGE L. ROTHROCK.